US010472082B2

(12) United States Patent
Leachman

(10) Patent No.: US 10,472,082 B2
(45) Date of Patent: Nov. 12, 2019

(54) FUME TIGHT SOCK COLLECTOR/BOX

(71) Applicant: Bell Helicopter Textron Inc., Fort Worth, TX (US)

(72) Inventor: Joseph Daniel Leachman, Keller, TX (US)

(73) Assignee: BELL HELICOPTER TEXTRON INC., Fort Worth, TX (US)

(*) Notice: Subject to any disclaimer, the term of this patent is extended or adjusted under 35 U.S.C. 154(b) by 145 days.

(21) Appl. No.: 15/463,879

(22) Filed: Mar. 20, 2017

(65) Prior Publication Data

US 2018/0265210 A1    Sep. 20, 2018

(51) Int. Cl.
| | |
|---|---|
| *F16L 55/168* | (2006.01) |
| *B64D 37/00* | (2006.01) |
| *B64C 27/64* | (2006.01) |
| *F16L 55/07* | (2006.01) |
| *F16L 23/16* | (2006.01) |
| *B64C 1/14* | (2006.01) |
| *F02M 25/08* | (2006.01) |
| *B64C 27/605* | (2006.01) |
| *B64C 27/82* | (2006.01) |
| *F02M 37/00* | (2006.01) |

(52) U.S. Cl.
CPC ......... *B64D 37/005* (2013.01); *B64C 1/1453* (2013.01); *B64C 27/64* (2013.01); *F02M 25/0872* (2013.01); *F16L 23/167* (2013.01); *F16L 55/07* (2013.01); *F16L 55/168* (2013.01); *B64C 27/605* (2013.01); *B64C 27/82* (2013.01); *F02M 37/0052* (2013.01); *F02M 2025/0863* (2013.01); *F16L 2201/30* (2013.01); *Y10T 137/5762* (2015.04)

(58) Field of Classification Search
CPC .. F16L 23/167; F16L 55/168; Y10T 137/5762
USPC .......................................... 285/13; 220/4.24
See application file for complete search history.

(56) References Cited

U.S. PATENT DOCUMENTS

| | | | | |
|---|---|---|---|---|
| 2,937,520 A | * | 5/1960 | Bell | F16L 23/167 |
| | | | | 73/40.5 R |
| 4,304,206 A | | 12/1981 | Hall | |
| 5,141,256 A | * | 8/1992 | Ziu | F16L 39/005 |
| | | | | 285/13 |
| 5,312,137 A | | 5/1994 | Nee | |
| 5,831,149 A | * | 11/1998 | Webb | F16L 39/005 |
| | | | | 73/40.5 R |
| 6,446,661 B2 | | 9/2002 | Armenia et al. | |
| 6,695,358 B2 | * | 2/2004 | Bonn | F16L 7/02 |
| | | | | 285/13 |
| 7,525,042 B2 | * | 4/2009 | Lazzaro | H02G 3/086 |
| | | | | 174/135 |

(Continued)

FOREIGN PATENT DOCUMENTS

| | | |
|---|---|---|
| EP | 2053294 A2 | 4/2009 |
| WO | 2015099860 A2 | 7/2015 |

*Primary Examiner* — Kevin F Murphy
(74) *Attorney, Agent, or Firm* — Slater Matsil, LLP

(57) ABSTRACT

An embodiment fluid recovery structure includes a body having an interior cavity, ports integrally joined to first walls of the body and having port walls that extend away from the body, with each of the ports having a port opening that is contiguous with the interior cavity, and a drain structure integrally joined to a second wall of the body and having a drain hole that extends from the interior cavity through the drain structure.

19 Claims, 12 Drawing Sheets

(56) References Cited

U.S. PATENT DOCUMENTS 9,434,600 B2* 9/2016 Yoo ..................... B67D 7/3209
2015/0291290 A1 10/2015 Leachman

* cited by examiner

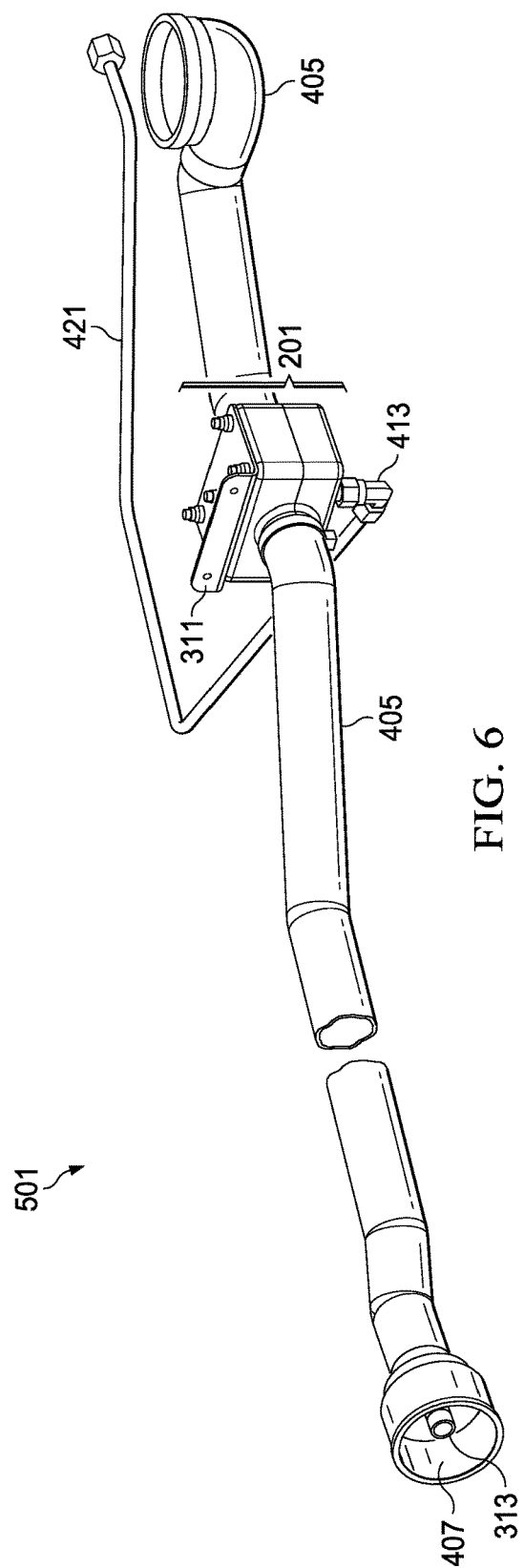

FUME TIGHT SOCK COLLECTOR/BOX

TECHNICAL FIELD

The present invention relates generally to a system and method for a fume tight system and fluid recovery structure, and, in particular embodiments, to a system and method for making and using a fluid collection structure for enclosing fluid transfer elements and providing fume tight drainage for fluid leakage from the fluid transfer elements.

BACKGROUND

A rotorcraft may include one or more rotor systems including one or more main rotor systems. A main rotor system generates aerodynamic lift to support the weight of the rotorcraft in flight and thrust to move the rotorcraft in forward flight. Another example of a rotorcraft rotor system is a tail rotor system. A tail rotor system may generate thrust in the same direction as the main rotor system's rotation to counter the torque effect created by the main rotor system. For smooth and efficient flight in a rotorcraft, a pilot balances the engine power, main rotor collective thrust, main rotor cyclic thrust and the tail rotor thrust, and a control system may assist the pilot in stabilizing the rotorcraft and reducing pilot workload Generally, aircraft, including rotorcraft, are powered by turbine or piston engines, each of which uses a combustible fluid as a fuel source. The fuel system is a fluid handling system that delivers fuel from fuel storage system to the engine system, where the engines burn the fuel to power the aircraft. Additionally, other fluids, such as hydraulic fluid, coolant, or the like, may be provided by various fluid handling systems extending throughout the aircraft.

SUMMARY

An embodiment fluid recovery structure includes a body having an interior cavity, ports integrally joined to first walls of the body and having port walls that extend away from the body, with each of the ports having a port opening that is contiguous with the interior cavity, and a drain structure integrally joined to a second wall of the body and having a drain hole that extends from the interior cavity through the drain structure.

An embodiment fluid system includes a fluid tube, and a collector disposed around the fluid tube, with the collector having a body with an interior cavity. The collector further has ports integrally formed at first walls of the body, with each of the ports having a port opening that is contiguous with the interior cavity. The fluid tube extends through the interior cavity and the port opening of each of the ports. The collector further has a drain structure integrally formed in a second wall of the body and the drain structure has a drain hole that extends from the interior cavity through the drain structure.

An embodiment vehicle includes an engine, a fuel tank, a fluid tube connected to the fuel tank and to the engine and configured to direct fuel from the fuel tank to the engine, and a collector mounted to a mounting point within the vehicle and disposed around the fluid tube, the collector having body with an interior cavity, and the collector further having ports integrally joined to first walls of the body, with each of the ports having a port opening that is contiguous with the interior cavity. The fluid tube extends through the interior cavity and the port opening of each of the ports, and the collector further has a drain structure integrally joined to a second wall of the body and having a drain hole that extends from the interior cavity through the drain structure. The vehicle further includes a drain tube connected to the drain structure, the drain tube configured to permit at least one of fluid and vapor collected within the interior cavity of the collector to drain from the collector through the drain tube.

An embodiment method for installing a fluid recovery structure includes mounting an upper box of a collector to a mounting point on a vehicle, affixing the upper box to a fluid tube of the vehicle, affixing a lower box of the collector to the upper box of the collector after the mounting the upper box and after the affixing the upper box to the fluid tube, where, after affixing the lower box to the upper box, the fluid tube extends through port openings of ports integrally formed as part of the collector and further extends through an interior cavity of the collector such that the fluid tube is spaced apart from interior surfaces of the collector, and attaching a drain tube to a drain structure integrally formed in a wall of the collector and having a drain hole that extends from the interior cavity through the drain structure.

BRIEF DESCRIPTION OF THE DRAWINGS

For a more complete understanding of the present invention, and the advantages thereof, reference is now made to the following descriptions taken in conjunction with the accompanying drawings, in which:

FIGS. 5 and 6 illustrate views of a portion of a fluid recovery system according to some embodiments;

Corresponding numerals and symbols in the different figures generally refer to corresponding parts unless otherwise indicated. The figures are drawn to clearly illustrate the relevant aspects of the embodiments and are not necessarily drawn to scale.

DETAILED DESCRIPTION OF ILLUSTRATIVE EMBODIMENTS

Figure 1:
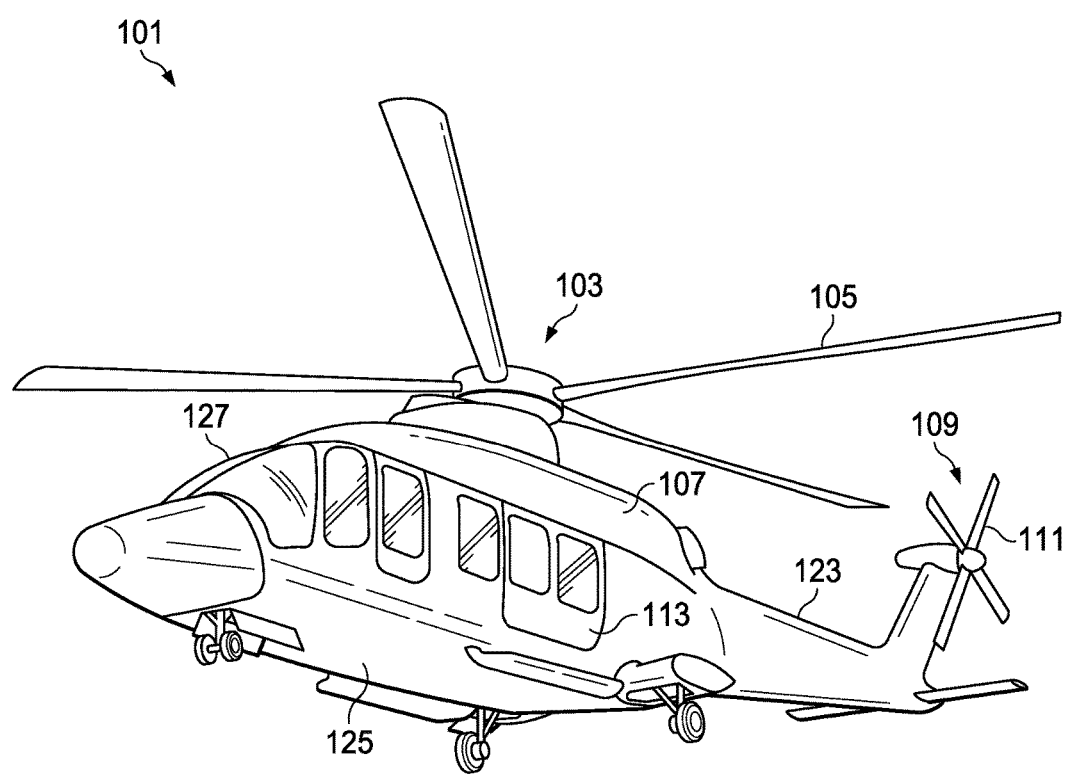
FIG. 1 illustrates a rotorcraft according to some embodiments.

Illustrative embodiments of the system and method of the present disclosure are described below. In the interest of clarity, all features of an actual implementation may not be described in this specification. It will of course be appreciated that in the development of any such actual embodiment, numerous implementation-specific decisions may be made to achieve the developer's specific goals, such as compliance with system-related and business-related constraints, which will vary from one implementation to another. Moreover, it should be appreciated that such a development effort might be complex and time-consuming but would nevertheless be a routine undertaking for those of ordinary skill in the art having the benefit of this disclosure.

Reference may be made herein to the spatial relationships between various components and to the spatial orientation of various aspects of components as the devices are depicted in the attached drawings. However, as will be recognized by those skilled in the art after a complete reading of the present disclosure, the devices, members, apparatuses, etc. described herein may be positioned in any desired orientation. Thus, the use of terms such as "above," "below," "upper," "lower," or other like terms to describe a spatial relationship between various components or to describe the spatial orientation of aspects of such components should be understood to describe a relative relationship between the components or a spatial orientation of aspects of such components, respectively, as the device described herein may be oriented in any desired direction.

The increasing use of rotorcraft, in particular, for commercial and industrial applications, has led to the development of larger more complex rotorcraft. However, as rotorcraft become larger and more complex, rotorcraft include increasingly large and more numerous systems for redundancy and new functionality. Since rotorcraft use one or more main rotors to simultaneously provide lift, control attitude, control altitude, and provide lateral or positional movement, the rotorcraft may have redundant control systems, such as hydraulic control systems, or may have extensive fuel systems connecting to remote or multiple fuel tanks. Additionally, with the increase in automation in rotorcraft, for example, the use of fly by wire (FBW) systems and the increasing authority ceded to the FBW systems, the amount of system critical electrical systems increases proportionately.

Embodiments of the system and method provided herein are directed to providing a fume tight recovery system that encases or enclosed fluid systems to prevent the escape of fluids or fumes as a result of leaks in the fluid systems. More specifically, the system includes a collector that is a fume tight fluid recovery structure that may be joined with, or connected to, one or more collection socks to provide a collection and drainage point for leaking fluids. In some embodiments, the collector may be a two piece snap-together enclosure formed by additive manufacturing such as selective laser sintering (SLS) or the like. The collector may be provided with an integrated drain structure for connection of a drain line or fitting. In some embodiments, the collector is attached around a fluid handling line, and the collection socks are connected to the collector so that the socks and collector enclose the fluid handling line and provide a system that retains any fumes or fluids that escape from the fluid handling lines, and subsequently drains the fluid or vapor, for example, an overflow bottle or the like.

The use of the enclosed fume tight recovery system ensures that fuel drips or vapors that escape from the fluid handling line are prevented from getting into passenger spaces or into avionics, which may be hot or spark in the event of a problem. Additionally, forming the collector using the SLS process permits the collector to be formed from a polymer, ceramic, metal or other material with high precision, repeatable manufacture of the collector in two halves, which may be joined together without the need for a gasket or sealant due to the precision achieved during manufacture. Additionally, the SLS process permits a complex drain structure, or the like, that is integrally formed in one of the collector body halves, reducing the number of fittings and related seals, which, in turn reduces the opportunity for joint failure. Thus, the collector may be formed in two parts from a polymer material, avoiding the need to form an enclosure from sheet metal with a separate drain fitting, and permitting the collector to be fume tight without sealant in the joints, corners or seams.

FIG. 1 illustrates a rotorcraft 101 according to some embodiments. The rotorcraft 101 has a main rotor system 103, which includes a plurality of main rotor blades 105. The pitch of each main rotor blade 105 may be controlled by a swashplate (not shown) in order to selectively control the attitude, altitude and movement of the rotorcraft 101. The swashplate may be used to collectively and/or cyclically change the pitch of the main rotor blades 105. The rotorcraft 101 also has an anti-torque system, which may include a tail rotor 109, no-tail-rotor (NOTAR), or dual main rotor system. In rotorcraft with a tail rotor 109, the pitch of each tail rotor blade 111 is collectively changed in order to vary thrust of the anti-torque system, providing directional control of the rotorcraft 101. The pitch of the tail rotor blades 111 is changed by one or more tail rotor actuators (not shown). In some embodiments, the FBW system sends electrical signals to the tail rotor actuators or main rotor actuators to control flight of the rotorcraft 101. Additionally, the tail rotor actuators or main rotor actuators may be hydraulically actuated, and may be connected to one or more hydraulic pumps or the like by hydraulic lines or fittings that are disposed in a fume tight recovery system to contain any potential leakage of hydraulic fluids or vapor.

The rotorcraft 101 further includes a fuselage 125 and tail section 123. The fuselage 125 includes a passenger compartment 113 or cargo area, and a cockpit 127, which includes displays, controls, and instruments. It should be appreciated that even though rotorcraft 101 is depicted as having certain illustrated features, the rotorcraft 101 may have a variety of implementation-specific configurations. For instance, in some embodiments, cockpit 127 is configured to accommodate a pilot or a pilot and co-pilot, as illustrated. It is also contemplated, however, that rotorcraft 101 may be operated remotely, in which case cockpit 127 could be configured as a fully functioning cockpit to accommodate a pilot (and possibly a co-pilot as well) to provide for greater flexibility of use, or could be configured with a cockpit having limited functionality (e.g., a cockpit with accommodations for only one person who would function as the pilot operating perhaps with a remote co-pilot or who would function as a co-pilot or back-up pilot with the primary piloting functions being performed remotely. In yet other contemplated embodiments, rotorcraft 101 could be configured as an unmanned vehicle, in which case cockpit 127 could be eliminated entirely in order to save space and cost.

Power is supplied to the main rotor system 103 and the anti-torque system by engines (not shown). There may be one or more engines, which may be controlled according to signals from the FBW system. The engines may be disposed in an upper fuselage portion 107, and one or more fuel tanks (not shown) may be disposed, for example, in the belly of the rotorcraft below the passenger compartment 113. In some embodiments, the fuel tanks may be connected to the engines by one or more fuel lines of a fuel handling system that extend near, along, or adjacent to, the passenger compartment 113, and may be disposed within a fume tight recovery system. The output of the engine is provided to a driveshaft, which is mechanically and operatively coupled to the main rotor system 103 and the anti-torque system through a main rotor transmission and a tail rotor transmission, respectively.

Figure 2A:
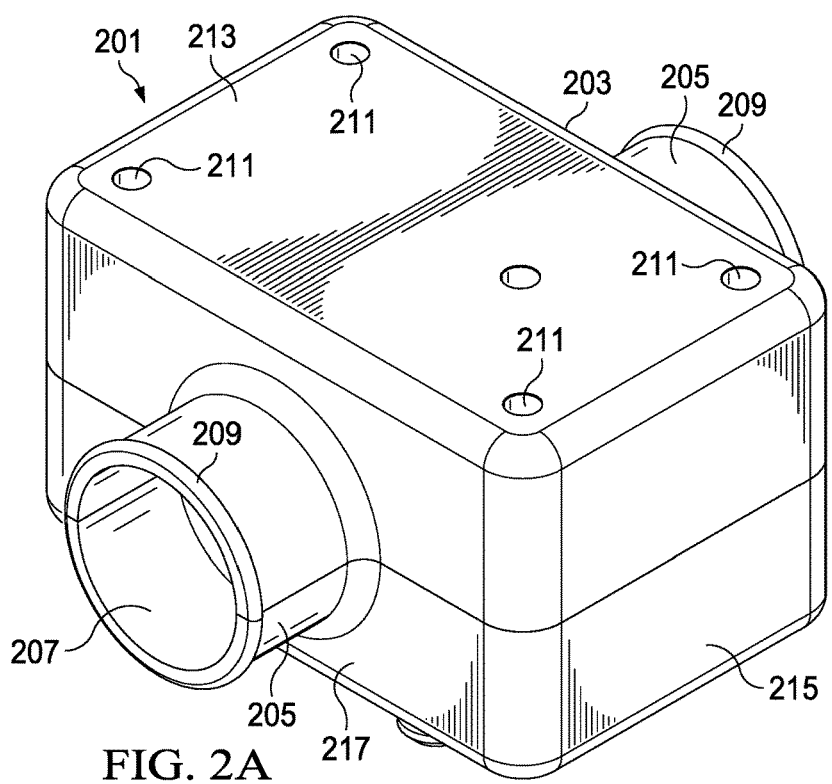
FIGS. 2A and 2B illustrate a fume tight fluid recovery system collector according to some embodiments.
Figure 2B:
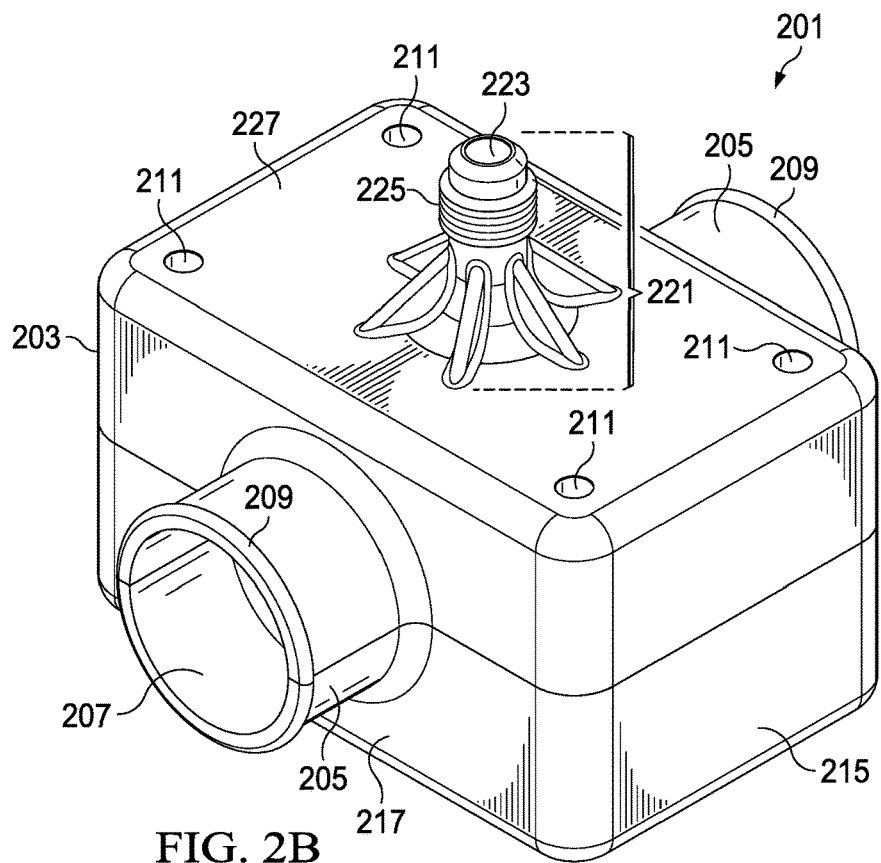

FIGS. 2A and 2B illustrate a collector 201 for a fume tight fluid recovery system according to some embodiments. FIG. 2A illustrates a top view of an embodiment of the collector 201. The collector 201 has a collector body 203 that has an interior cavity (not shown) that may house a fluid line, fluid handling system fitting, or the like. The enclosed space or interior cavity of the collector 201 may be defined by the top wall 213, bottom wall (see FIG. 2B, element 227), front wall 217, back wall (not shown) and side walls 215 of the collector 201. In some embodiments, the collector 201 has one or more ports 205 disposed in one or more sides or faces of the collector body 203, and port walls that extend away from the sides of the collector body 203. Each of the ports 205 has a port opening 207 through which a fluid line exits or enters the collector 201. The ports 205 are integrally joined to the collector body 203 and the port openings 207 are contiguous with the interior cavity of the collector body 203. In some embodiments, the ports 205 may be disposed on opposite sides of the collector body 203 so that the collector 201 may be disposed around a straight fluid line. Thus, the collector may have a port 205 disposed at a front wall 217 of the collector 201, and another, or matching port 205 disposed at a back wall (not shown) of the collector 201. In some embodiments, each of the ports 205 may also have a retaining lip 209 on an outside surface. The retaining lip 209 may, in some embodiments, be a raised ring, region, or the like that allows a sock, tube, hose, or the like to be disposed around the outside of the port 205 and clamped. The retaining lip 209 prevents the clamp and clamped sock from slipping off the port 205.

In some embodiments, the collector 201 may have one or more assembly holes 211 disposed in a top wall 213 of the collector body 203 and that extend into, or through the collector body 203. In some embodiments, the assembly holes 211 may be sized to accept assembly fasteners that retain halves of the collector body 203 when the collector 201 is formed form two or more sections or portions. In other embodiments, the assembly holes 211 may extend our partially through the collector body 203 and may accept fasteners for attaching the collector 201 to a mounting bracket, structure, or other mounting point.

In some embodiments, the collector 201 may be formed using SLS, deposition manufacturing, or another additive manufacturing process, molding such as injection molding, using machining or another subtractive manufacturing process, or the like. The use of SLS permits the manufacturing of customized collectors having complex shapes without the need for molds, as in injection molding.

FIG. 2B illustrates a bottom view of the collector 201 according to some embodiments. In some embodiments, the collector 201 has a drain structure 221 disposed in a bottom wall 227 of the collector body 203. The drain structure 221 has a drain hole 223 that extends from the interior cavity of the collector body 203 outside of the collector 201, permitting fluid and vapor collected by the collector 201 to be drained from around the enclosed fluid tube. The drain structure 221 may also include a drain structure fitting 225 that accepts a mating drain tube fitting (not shown). In an embodiment, the drain structure 221 is integrally formed into the collector 201, reducing the number of seams or joints in the collector 201, and consequently reducing the number of potential leaks or points of failure, and the number of seals required.

Additionally, the collector 201 is shown with assembly holes 211 in the bottom wall 227 of the collector body 203. The assembly holes 211 in the bottom wall 227 may extend through the collector body 203 and through the top wall 213 of the collector 201, permitting fasteners to extend through the collector body 203 to, for example, retain a top half of the collector 201 to a bottom half of the collector 201. This permits the collector 201 to be formed in two pieces so that the collector 201 may be installed around an existing or previously installed fluid tube. However, in other embodiments, the assembly holes 211 may extend only partially though the collector body 203, and may be used for fastening the collector body 203 to a bracket or other mounting point.

Figure 3:
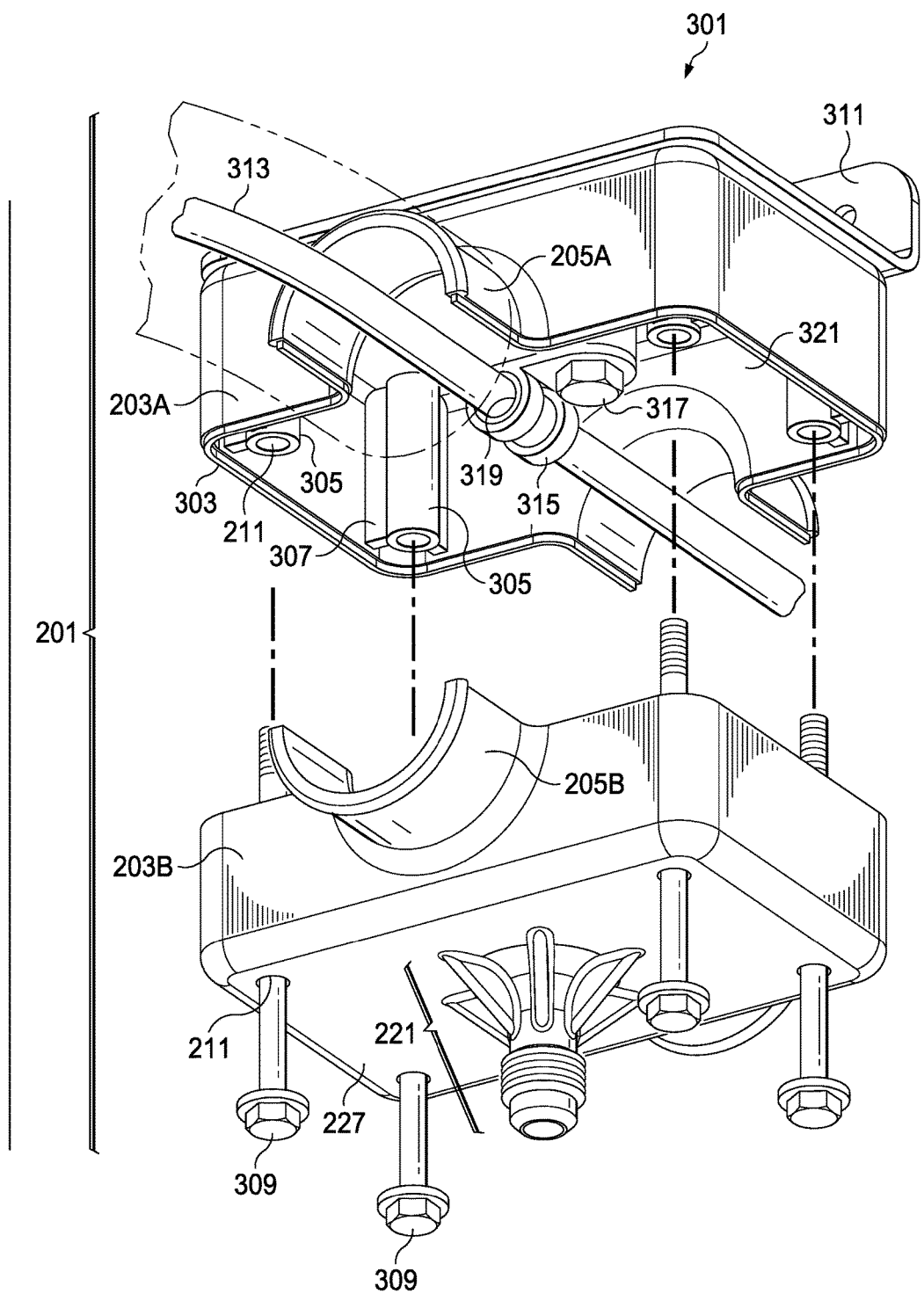
FIG. 3 illustrates an exploded view of a portion of a fluid recovery system according to some embodiments.

FIG. 3 illustrates an exploded view of a portion of a fluid recovery system 301 according to some embodiments. The collector 201 is illustrated as being hollow, or having an interior cavity 321 and being assembled around a fluid tube 313 so that the collector 201 encloses a portion of the fluid tube 313. In some embodiments, the collector 201 is formed from an upper box 203A or top portion and a lower box 203B or bottom portion. In some embodiments, the upper box 203A and lower box 203B are each formed using SLS so that each is contiguously formed without seams or joints in the respective portion. The upper box 203A and lower box 203B are formed to fit together at a seam or joint, and in some embodiments, have an assembly ridge 303 or lip disposed on each of the upper box 203A and lower box 203B. Thus, the number of seams or joints, and number of potential points of failure or leaks, is reduced, since the only joint is between the upper box 203A and lower box 203B. The assembly ridges 303 are complementary and fit closely together to form a fume tight and liquid tight joint after assembly. Additionally, the use of the assembly ridges 303 permits the lower box 203B to be snapped into place with an upper box 203A around a fluid tube 313 or the like so that a technician may mount the upper box 203A to the fluid tube by way of a fluid tube retainer such as a clamp 315, join the parts, and then have both hands free to install assembly fasteners 309 or the like. In other embodiments, the lower box 203B may be joined to the upper box 203A by an adhesive, using a gasket, by ultrasonic welding, or another technique that seals the joint between the upper box 203A and lower box 203B. Additionally, the collector 201 may be formed in two parts so that each of the upper box 203A and the lower box 203B include respective upper port portions 205A and lower port portions 205B.

The collector 201 may have a tube attachment structure that permits attachment of the collector to a fluid tube 313. In some embodiments, the upper box 203A may have, for example, a clamp 315, or the like, that secures the upper box 203A to the fluid tube 313. In some embodiments, the clamp 315 is secured to the upper box 203A by a clamp retainer 317 such as a screw, bolt, or the like. In other embodiments, the clamp 315 may be formed as an integral part of the upper box 203A, or another part of the collector 201. The clamp 315 has a clamp opening 319 in which the fluid tube 313 may be disposed during installation, and which is aligned with one or more of the ports 205 so that a retained fluid tube 313 his held with, and spaced apart from, interior surfaces of interior cavity and ports 205. Thus, a technician or installer may install the collector 201 by clamping the upper box 203A to the fluid tube 313 and securing the clamp 315 so that the upper box 203A is affixed to the existing fluid tube 313.

The technician may then affix the lower box 203B to the upper box, with the assembly ridges 303 retaining the lower box 203B to the upper box 203A and fluid tube 313 and then secure the lower box 203B to the upper box using the assembly fasteners 309.

The upper box 203A may be attached to a bracket 311 at, for example, a top wall of the collector 201. The bracket 311 may in turn be attached to a structure or other mounting point in an aircraft, vehicle, or other space. The upper box 203A may be joined to the lower box 203B by assembly fasteners 309 that may, in some embodiments, be bolts, screws, retainer clips, or the like. In some embodiments, the assembly fasteners 309 are bolts that are disposed in the assembly holes 211 and extends from the bottom wall 227 of the collector through the top wall. Additionally, in some embodiments, the assembly fasteners 309 may also extend through the bracket 311 so that the assembly fasteners 309 hold the upper box 203A and lower box 203B together and also hold the collector 201 to the bracket 311. While the bracket 311 is shown being disposed on an opposite side of the collector 201 from the drain structure 221, the recovery system 301 is not limited to the disclosed arrangement, as the bracket 311 may be shaped to conform around the drain structure 221 and may be disposed in the same side of the collector 201 as the drain structure 221, or may disposed in a side of the collector 201. In other embodiments, the bracket 311 may be omitted, and the collector 201 may be attached directly to a mounting point or the like by way of the assembly fasteners 309, by other fasteners, by an adhesive, by clips or another mounting structure, or the like.

The assembly holes 211 may be defined by assembly hole sleeves 305 that extend through the upper box 203A and lower box 203B within the interior cavity 321. The assembly hole sleeves 305 may be secured to the interior surfaces of the collector walls by assembly hole sleeve webbing 307, supports, or the like. End surfaces of the assembly hole sleeves 305 may have assembly ridges 303 that assist in providing a fume tight and fluid tight seal. Thus, the assembly holes 211 will be fume tight and fluid tight, eliminating the need for the assembly fasteners 309 to have gaskets to completely seal the collector 201.

Figure 4:
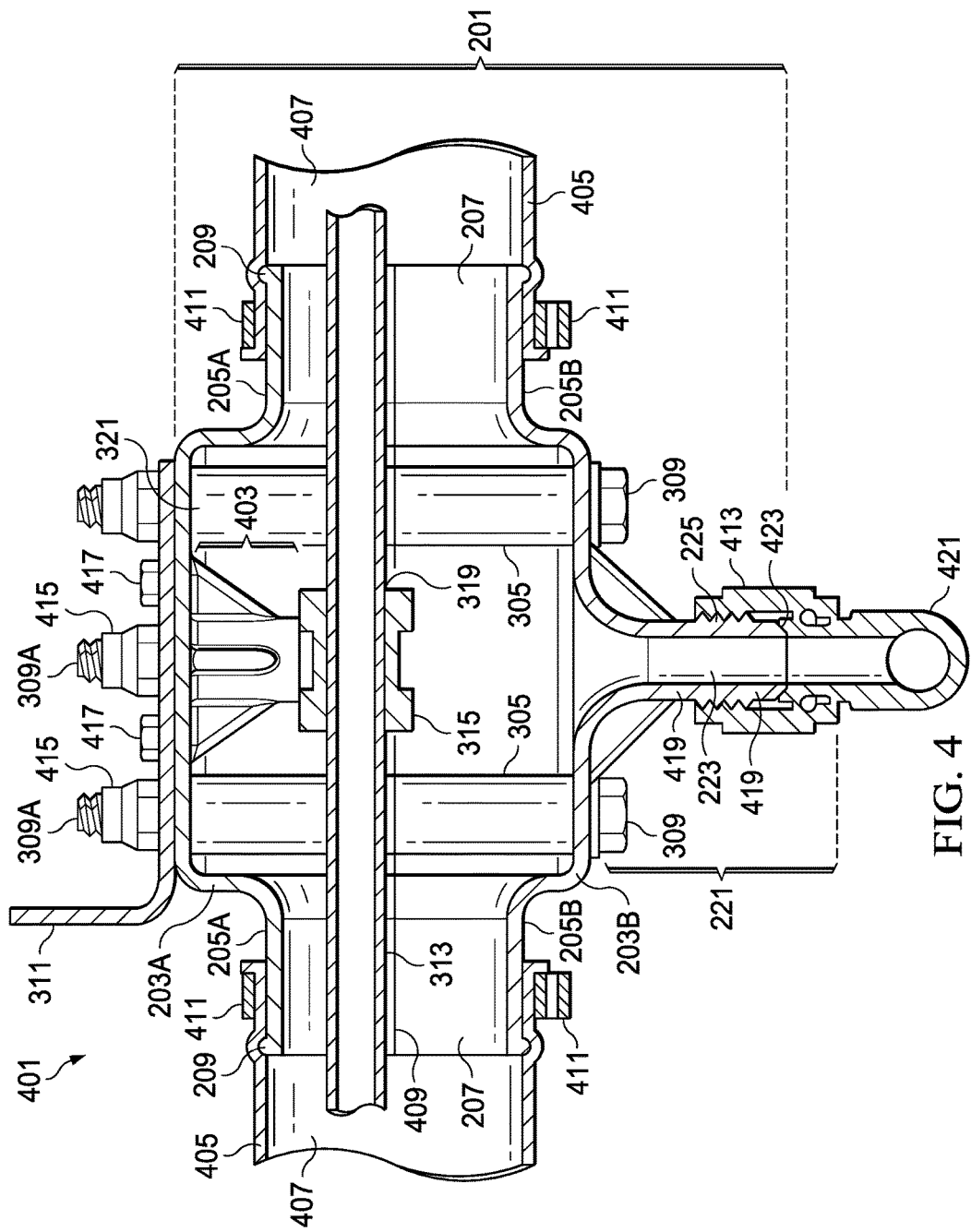
FIG. 4 illustrates a cutaway view of a fluid recovery system according to some embodiments.

FIG. 4 illustrates a cutaway view of a fluid recovery system 401 according to some embodiments. The collector 201 is formed from the upper box 203A and lower box 203B, which are joined at joint 409 and retained together by assembly fasteners 309. The assembly fasteners 309 may extend through the collector 201 in assembly hole sleeves 305 so that the fastener ends 309A extend outside of the collector 201 and are retained by fastener retainers 415. In some embodiments where the assembly fasteners 309 are bolts, the fastener retainers 415 are nuts or the like. In other embodiments, the fastener retainers 415 are clips, pins or other retaining structures that hold the upper box 203A to the lower box 203B and seal the collector 201 at the joint 409. Additionally, in some embodiments, the bracket 311 may be affixed to the collector 201 by bracket fasteners 417, or by the assembly fasteners 309.

Additionally, one or more socks 405 may be attached to collector 201. Each sock 405 may have an end disposed on, slipped over, or otherwise attached to the outer surface of one of the upper and lower port portions 205A and 205B. The socks 405 may be retained by sock clamps 411 disposed around the socks 405 to maintain the socks 405 in contact with the outer surface of the upper and lower port portions 205A and 205B. The sock clamps 411 may be zip ties, screw clamps such as hose clamps, rigid clamps that snap in place, or the like. In embodiments where the ports 205 have a retaining lip 209, the sock clamps 411 may be disposed between the retaining lips 209 and walls of the collector 201 so that the sock clamp 411 and retaining lip 209 prevent the socks 405 from slipping off of the ports 205 through vibration, handling by technicians, or the like. A sock cavity 407 in each sock 405 permits the fluid tube 313 extend out of the collector interior cavity 321 within a continuous, fume and fluid tight region bounded by the socks 405 and collector 201.

The fluid tube 313 is retained in the clamp opening 319 by the clamp 315 so that the fluid tube 313 passes through a first port opening 207, through the interior cavity 321 of the collector 201 and through another port opening 207 without contacting the interior surfaces of the ports 205, socks 405 or interior cavity 321. The clamp 315 maybe spaced apart from the interior surfaces of the collector walls by, for example, a standoff 403 or other spacing structure. In some embodiments, the standoff 403 is integrally formed on the collector body 203, and may be configured to accept a clamp retainer (see, e.g., element 317 in FIG. 3) and retain the fluid tube 313 to the collector 201.

The interior cavity 321 of the collector 201 is contiguous with the drain hole 223 so that fluids or vapors that escape the fluid tube 313 flow through the socks 405 into the collector 201 and drain out the drain hole 223. A drain tube 421 is affixed to the drain structure 221 by a drain tube fitting 413. In some embodiments, the drain structure 221 has a drain structure seat 423 that seals against a portion of the drain tube fitting 413 or the drain tube 421. Additionally, in some embodiments, the drain tube fitting 413 is threaded, and mates with the drain structure fitting 225. The drain structure fitting 225 may be a polymer or other material used to form the collector, and may be produced in a blank or unthreaded form. The drain tube fitting 413 may create or cut threads in the drain structure fitting 225 when the drain tube fitting 413 is affixed to the drain structure fitting 225, and so that the drain tube fitting 413 creates a fume and fluid proof seal with the drain structure fitting 225 that is redundant to the seal created by the drain structure seat 423. In some embodiments, the drain structure 221 has drain structure sidewalls 419 that separate the drain structure fitting 225 from the drain structure seat 423, and drain structure sidewalls 419 that separate the drain structure fitting 225 from the walls of the collector body 203.

Figure 5:
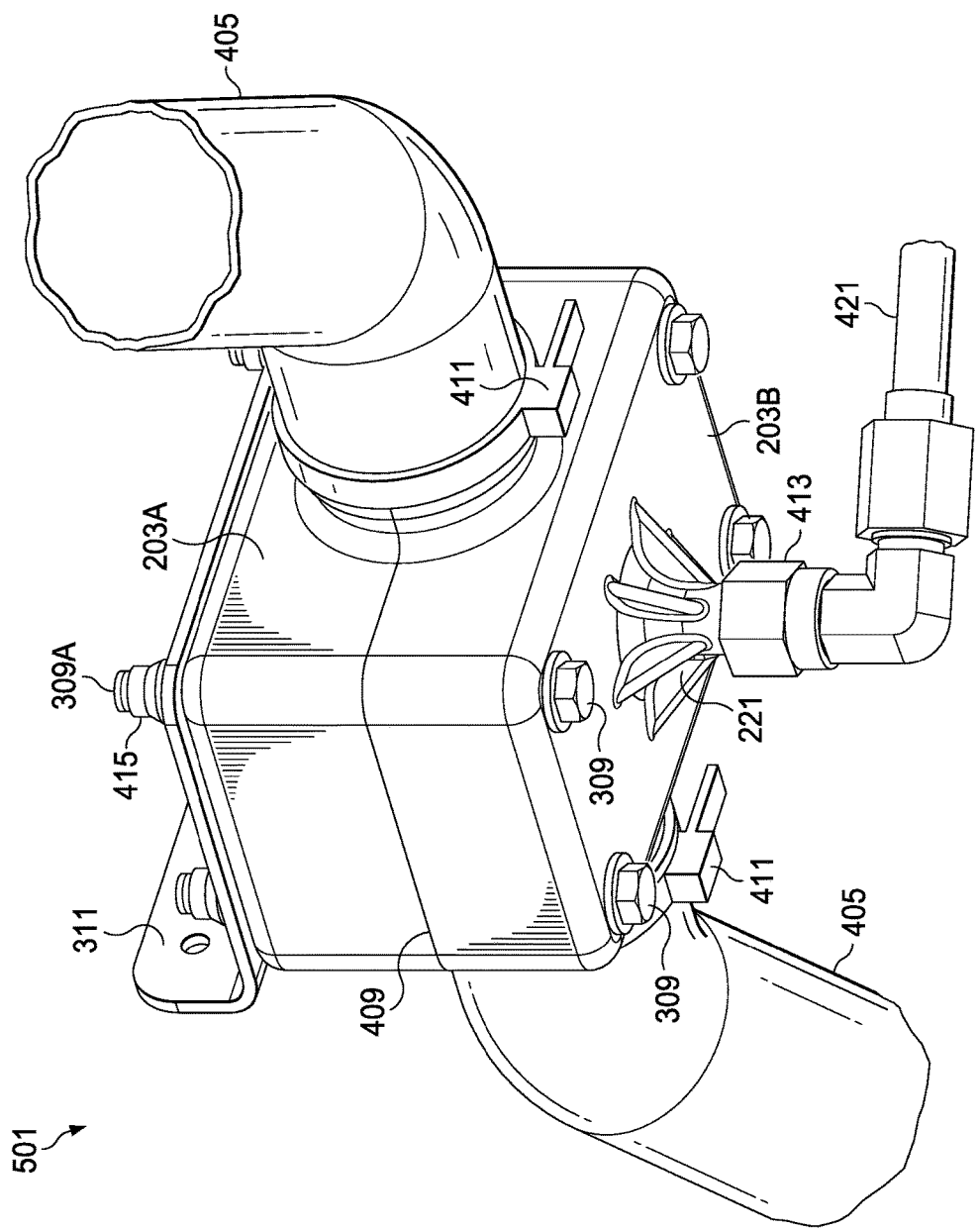

FIGS. 5 and 6 illustrate views of a portion of a fluid recovery system 501 according to some embodiments. The socks 405 extend away from the collector 201 and enclose the fluid tube 313, creating a fume and fluid tight barrier or envelope around the fluid tube 313.

Figure 7A:
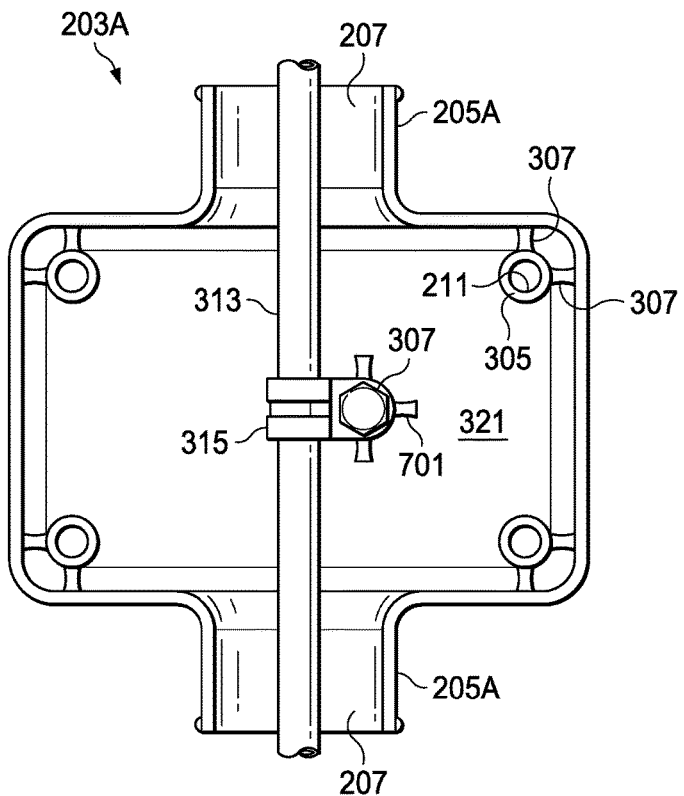
FIGS. 7A and 7B illustrate views of an upper box 203A with a clamp system for a fluid recovery system according to some embodiments.
Figure 7B:
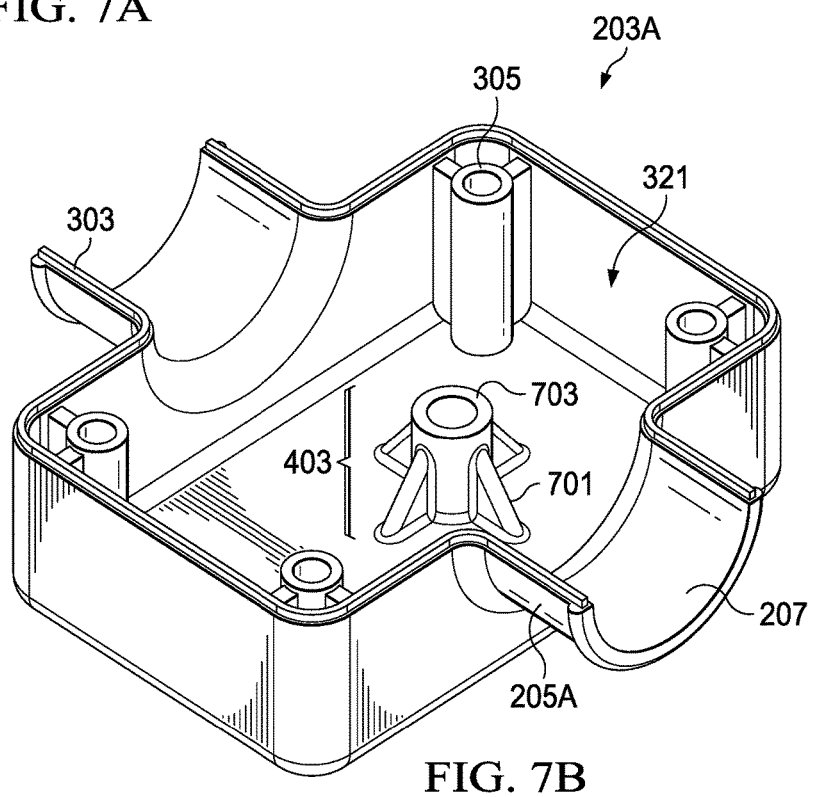

FIGS. 7A and 7B illustrate views of an upper box 203A with a clamp 315 for a fluid recovery system according to some embodiments. The clamp 315 is spaced apart from the interior surfaces of the upper port portion 205A and interior cavity 321 from the surface of the fluid tube 313, preventing friction and potentially premature wear of the socks, collector 201 and fluid tube 313. The clamp 315 is attached by the clamp retainer 317 to a standoff 403, which provides the offset or spacing from the interior surfaces of the collector 201. Providing spacing between the fluid tube 313 and the interior surfaces of the socks 405 or interior surfaces of the collector 201 permits the free flow of fluids and vapors through the port and along the surface of the port opening, so that the vapors may condense in the collector 201, any fluids may drain into the collector 201.

In some embodiments, the standoff 403 has a standoff body 703 supported by standoff webbing 701 which acts as a set of supports, gussets, braces, stiffeners, or the like, to strengthen the standoff body using a minimal amount of material. Additionally, the standoff 403, including the standoff body 703 and standoff webbing 701, may be integrally formed into the collector lower box 203A. In other embodiments, the standoff 403 may be formed separately from the collector and attached to the interior surface of the lower box 203A by fasteners, an adhesive, clips, of the like to provide a customizable standoff height, permitting adjustment of the placement of a fluid tube 313 for fluid tubes of different sizes, shapes, or the like.

Figure 8A:
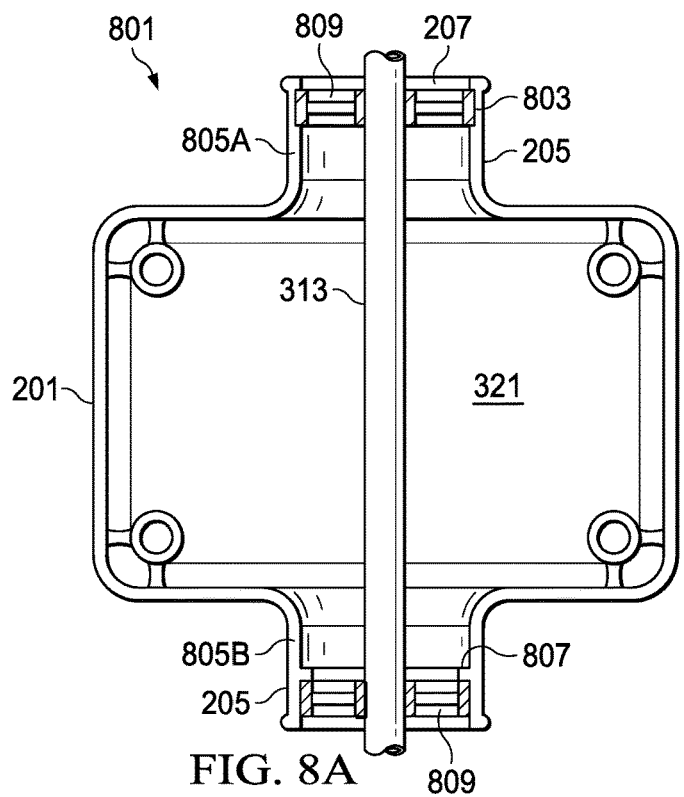
FIGS. 8A and 8B illustrate views of a fluid recovery structure with a retaining adapter according to some embodiments.
Figure 8B:
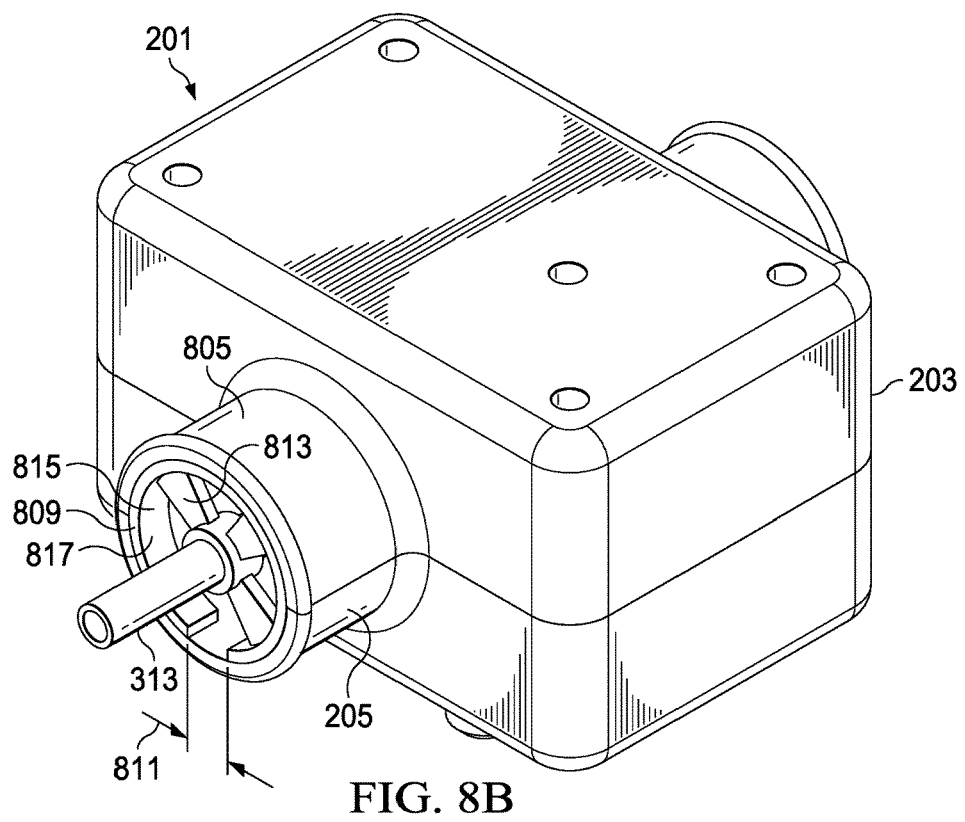

FIGS. 8A and 8B illustrate views of a fluid recovery structure 801 with a retaining adapter 809 according to some embodiments. The structure 801 may include a fluid tube retainer such as a retaining adapter 809, as described in United States Patent Publication No. 2015/0291290, titled "Adapter for Aircraft Fluid Transmission Lines", filed on Apr. 11, 2014 on behalf of inventor Joseph Leachman, and which is incorporated by reference in its entirety. The retaining adapter 809 may be disposed within one or more ports 205 of the collector 201. The retaining adapter 809 accepts a fluid tube 313 and holds the fluid tube 313 in relation to the collector 201 so that the fluid tube 313 is spaced apart from the surfaces of the interior cavity 321 and the port wall 805. The retaining adapter 809 may have one or more spokes 813 supporting an inner shell, collar or other structure for retaining a fluid tube 313. The spokes 813 are spaced apart by spoke spaces 815 and are disposed within an outer shell 817, which has a gap 811. The spoke spaced 815 and the gap 811 permit the free flow of fluids and vapors through the port 205 and along the surface of the port opening 207, so that the vapors may move into the collector 201 for condensation, any so that fluids may drain into the collector 201 from socks or the like.

The retaining adapter 809 may be affixed in place within the port opening 207 to prevent the retaining adapter 809 from sliding out of the port opening 207 due to vibration or the like. In some embodiments, the retaining adapter 809 maybe disposed in a recess 803 in the surface of the port wall 805A. In other embodiments, the retaining adapter 809 may be retained by one or more port lips 807 that are raised sections of the interior surface of the port wall 805B. In yet other embodiments, the retaining rings may be held in the port opening 207 by an adhesive, a fastener such as a set screw, bolt or other mechanical fastener, a retaining pin, or the like.

Figure 9A:
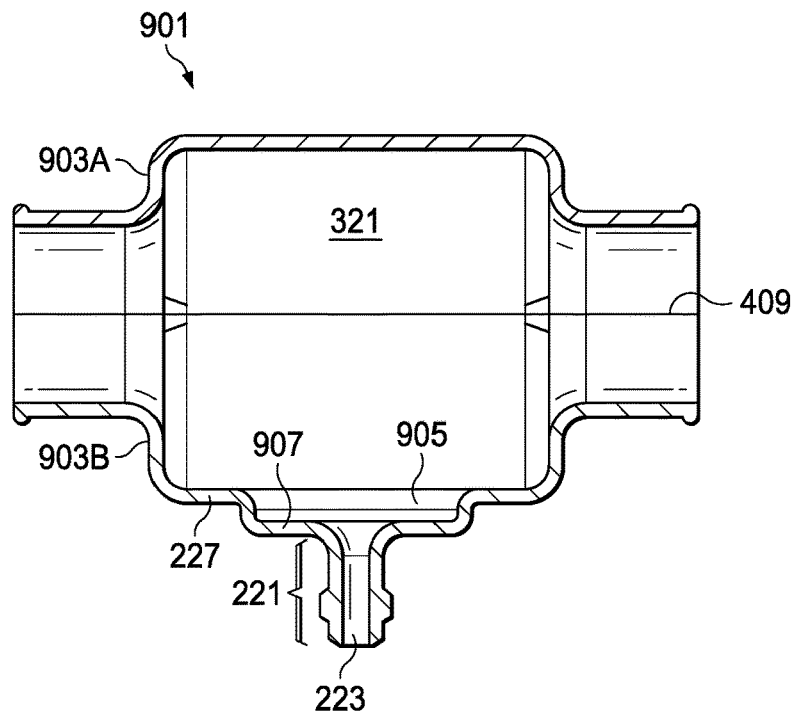
FIGS. 9A and 9B illustrate views of a drain structure of a collector according to some embodiments.
Figure 9B:
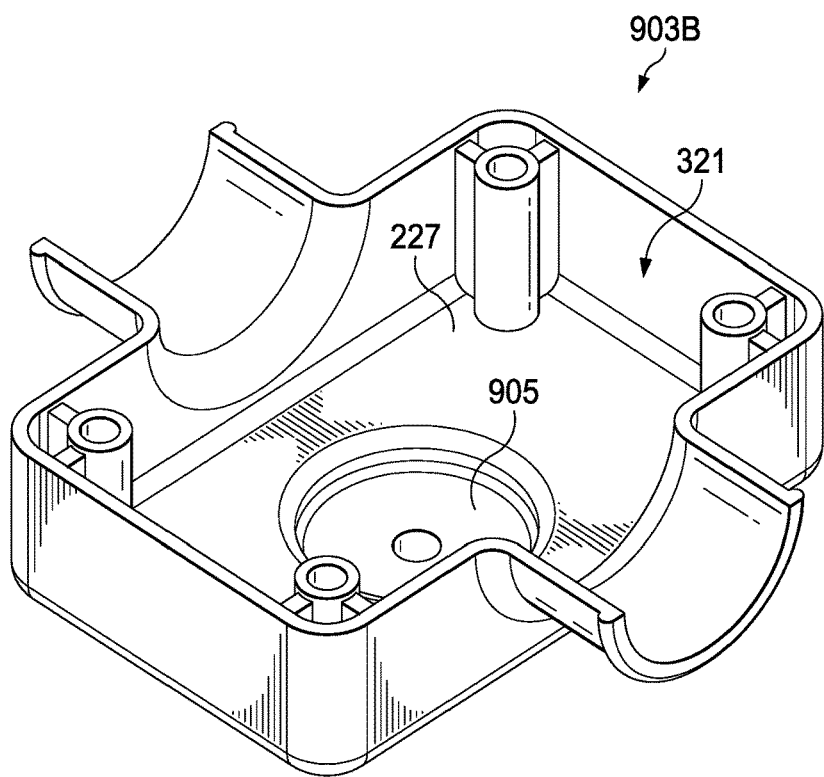

FIGS. 9A and 9B illustrate views of a drain structure 221 of a collector 901 according to some embodiments. In some embodiments, the collector has an upper box 903A and a lower box 903B with a recess 905 that serves to concentrate or direct collected or condensed fluids into a recessed portion 907 region near the drain hole 223. Thus, fluids or vapors entering the interior cavity 321 may move, by gravity, through the recess into the drain hole. In some embodiments, the recess 905 is disposed in the bottom wall 227 of the lower box 903B, and the drain structure 221 is disposed in the recessed portion 907 of the lower box 903B. The recess 905 may be formed by the recessed portion 907 in the bottom wall 227 of the collector 901. In other embodiments, the recess 905 may formed by thinning or otherwise shaping the inner surface of the bottom wall 227 of the collector 901. While the recess 905 is shown as being circular with a flat bottom profile, the recess 905 is not limited to such as shape, as the recess 905 may be any shape with any bottom profile, including having a shape that is square, hexagonal, or the like, with a bottom profile that is conical, pyramidal, faceted, smooth, or the like.

Figure 10:
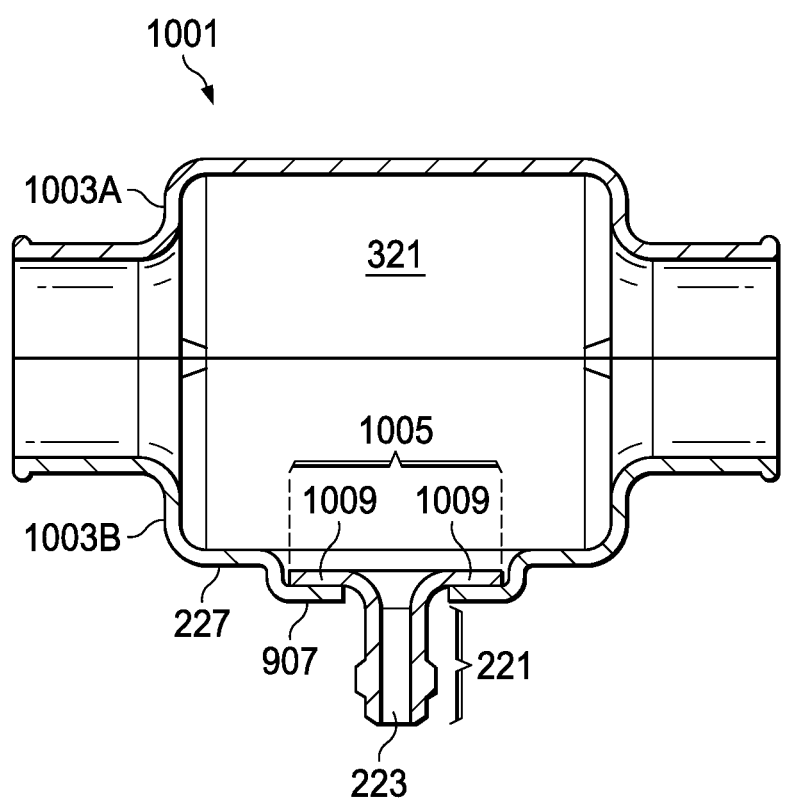
FIG. 10 illustrates a view of a drain structure of a collector according to some embodiments.

FIG. 10 illustrates a view of a drain structure 221 of a collector 1001 according to some embodiments. A collector 1001 has an upper box 1003A and lower box 1003B with an opening 1007 for an interchangeable drain element 1005. The drain element 1005 has a flange 1009 that retains the drain element 1005 within an opening 1007 in a wall of the collector 1001. In an embodiment, the flange 1009 may fit into a recess created by a recessed portion 907 of the bottom wall 227 of the collector 1001, and may be affixed with a gasket, sealant, adhesive, fastener, or the like. In some embodiments, the flange is sized to create a fume and fluid tight seal against the surface of the recessed portion 907.

Figure 11A:
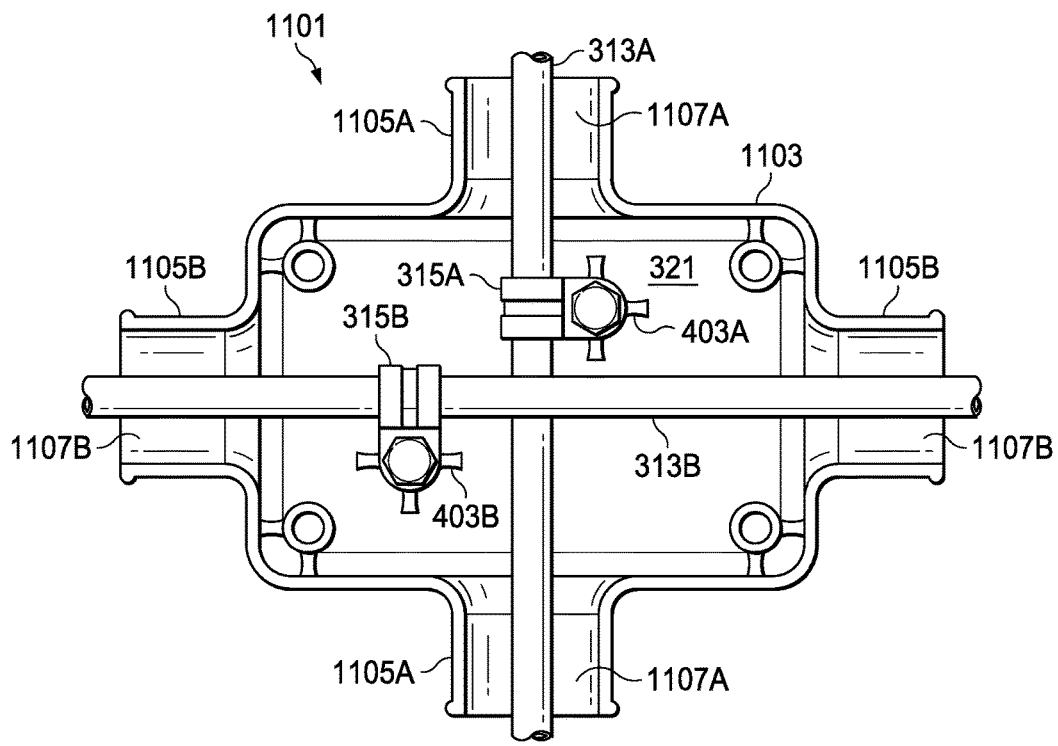
FIGS. 11A through 11C illustrate views of embodiments of collector upper box structures according to some embodiments.
Figure 11B:
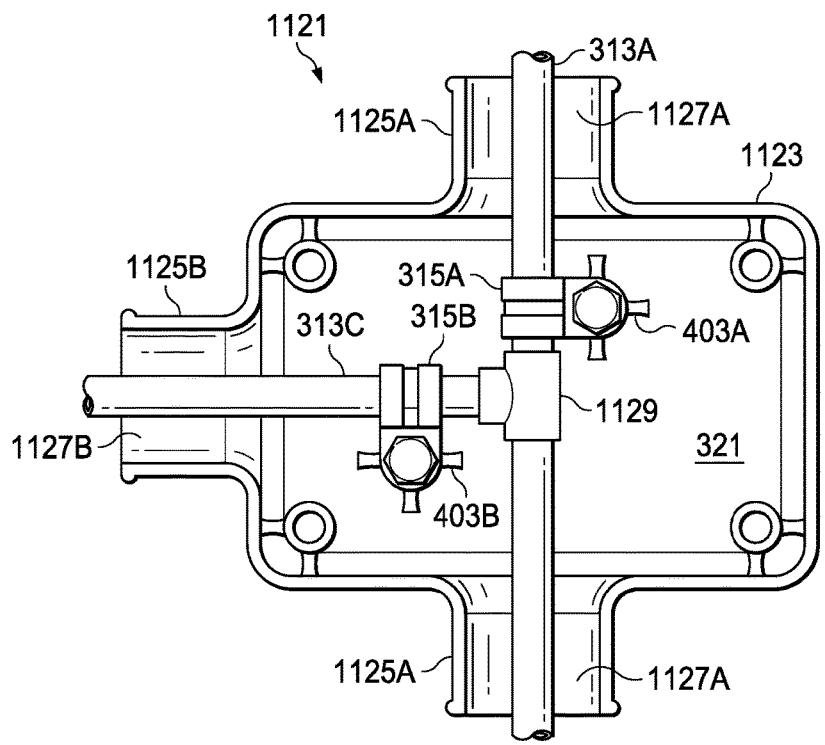
Figure 11C:
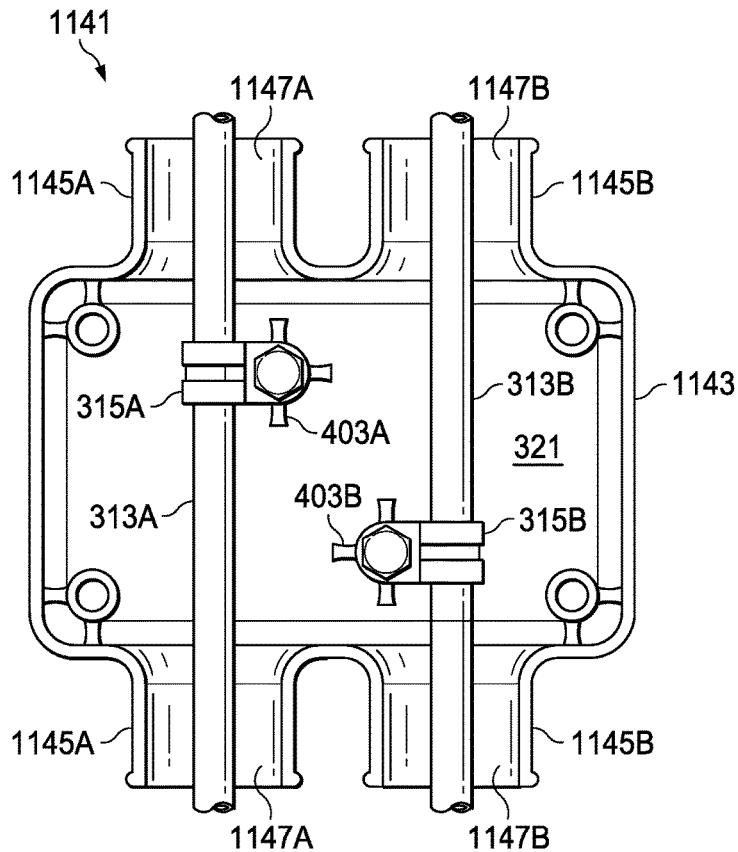

FIGS. 11A through 11C illustrate views of various upper box embodiments for different fluid recovery system embodiments. FIG. 11A illustrates a fluid recovery system arrangement 1101 upper box 1103 that is configured to engage with multiple fluid tubes 313A and 313B. In some embodiments, the upper box 1103 has first ports 1105A forming first port openings 1107A on opposite sides of the upper box 1103 and second ports 1105B forming second port openings 1107B on opposite sides of the upper box 1103, with the second ports 1105B on different sides of the upper box 1103 from those on which the first ports 1105A are disposed. A first clamp 315A is disposed on a first standoff 403A in the interior cavity 321, and holds a first fluid tube 313A so that the first fluid tube 313A is retained in the first port openings 1107A. A second clamp 315B is disposed on a second standoff 403B and holds a second fluid tube 313B so that the second fluid tube 313B is retained in the second port openings 1107B. Notably, the first standoff 403A may hold the first fluid tube 313A at a distance from the interior surface of the upper box 1103 that is different from the distance at which the second standoff 403B holds the second fluid tube 313B from the interior surface. Thus, the first fluid tube 313A and second fluid tube 313B cross each other within the interior cavity 321 without contacting each other.

FIG. 11B illustrates a fluid recovery system arrangement 1121 upper box 1123 that is configured to engage with multiple fluid tubes 313A and 313B connected to a fitting 1129 according to some embodiments. In some embodiments, the upper box 1123 has first ports 1125A forming first port openings 1127A on opposite sides of the upper box 1123 and at least one second port 1125B forming a second port opening 1127B on a side of the upper box 1123 that is different from the sides of the upper box 1123 on in which the first ports 1125A are disposed. A first clamp 315A is disposed on a first standoff 403A in the interior cavity 321, and holds a first fluid tube 313A with a fitting 1129 so that the first fluid tube 313A is retained in the first port openings 1127A and so that the fitting is retained in the interior cavity 321. A second clamp 315B is disposed on a second standoff 403B and holds a second fluid tube 313B so that the second fluid tube 313C is retained in the second port opening 1127B and joins to the fitting 1129. Notably, the first standoff 403A may hold the first fluid tube 313A at a distance from the interior surface of the upper box 1123 that is substantially similar to the distance the second standoff 403B holds the second fluid tube 313C. Thus, the first fluid tube 313A and second fluid tube 313B intersect each at the fitting 1129 so that the enclosure encloses the fitting 1129.

FIG. 11C illustrates a fluid recovery system arrangement 1141 upper box 1143 that is configured to engage with multiple fluid tubes 313A and 313B. In some embodiments, the upper box 1143 has first ports 1145A forming first port openings 1147A on opposite sides of the upper box 1143 and second ports 1145B forming second port openings 1147B on opposite sides of the upper box 1143, with the second ports 1145B on the same sides of the upper box 1143 as those on which the first ports 1145A are disposed. A first clamp 315A is disposed on a first standoff 403A in the interior cavity 321, and holds a first fluid tube 313A so that the first fluid tube 313A is retained in the first port openings 1147A. A second clamp 315B is disposed on a second standoff 403B and holds a second fluid tube 313B so that the second fluid tube 313B is retained in the second port openings 1147B. Thus, the first fluid tube 313A and second fluid tube 313B are both held in place within respective port openings 1147A and 1147B, and both extend through the interior cavity without touching or crossing each other.

Figure 12:
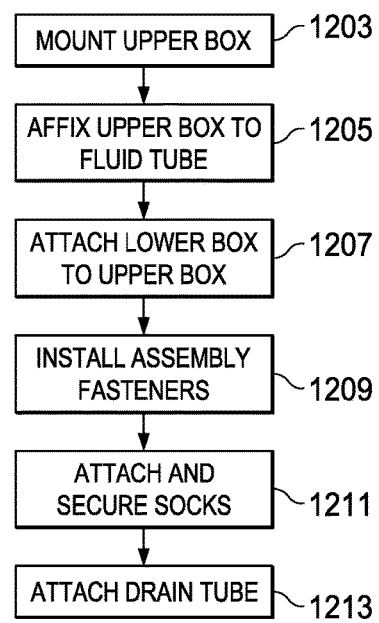
FIG. 12 is a flow diagram illustrating a method for installing a fume tight fluid recovery structure according to some embodiments.

FIG. 12 is a flow diagram illustrating a method 1201 for installing a fume tight fluid recovery structure according to some embodiments. The method 1201 includes, in block 1203, mounting an upper box of a collector. Mounting the upper box may include attaching the upper box to a mounting point in a vehicle or structure so that the upper box is adjacent to an existing fluid tube, or to a planned route of a fluid tube. In some embodiments, the upper box may be mounted directly to a mounting point by, for example, fastening the upper box directly to a bulkhead, or surface in a vehicle. In another embodiment, the upper box may be attached to a bracket mounted on the vehicle, or, in embodiments, where the upper box has a bracket attached prior to mounting, the upper box may be mounted by attaching the bracket to the vehicle.

In block 1205, the upper box is affixed to the fluid tube. In some embodiments, the upper box has a clamp that secures the fluid tube to the upper box, and affixing the upper box to the fluid tube may include securing the fluid tube within the clamp. In some embodiments, the upper box and fluid tube are affixed to each other using a retaining adapter. In such an embodiment, the retaining adapter may be placed around the fluid tube, and then placed in a port opening or other interior portion of the collector to affix the upper box to the fluid tube. In block 1207, the lower box is attached to the upper box. In some embodiments, the lower box may be attached to the lower box by engaging assembly ridges on the upper and lower boxes with each other. In other embodiments, a joining material such as a sealant, adhesive or gasket may be applied to the surfaces of the upper or lower boxes that form the joint between the upper and lower boxes, and then the lower box may be attached to the upper box so that the joining material holds the lower box to the upper box.

In block 1209, the assembly fasteners are installed. In embodiments where the assembly fasteners are bolts that extend through the collector, a technician may secure the bolts with nuts or other fastener retainers. In block 1211, socks are attached to the collector. In some embodiments, the socks are disposed over the exterior of the ports, and are secured by a sock clamp. In block 1213, a drain tube is attached to the collector.

An embodiment fluid recovery structure includes a body having an interior cavity, ports integrally joined to first walls of the body and having port walls that extend away from the body, with each of the ports having a port opening that is contiguous with the interior cavity, and a drain structure integrally joined to a second wall of the body and having a drain hole that extends from the interior cavity through the drain structure.

In some embodiments, the body includes an upper box and a lower box, with the upper box and lower box having complementary assembly ridges, the drain structure is integrally formed as part of the lower box and is disposed at a lower wall of the lower box, and each of the ports includes an upper port portion integrally formed as part of the upper box and a lower portion integrally formed as part of the lower box. In some embodiments, The fluid recovery structure further includes assembly hole sleeves integrally formed in each of the upper box and lower box, the assembly hole sleeves having assembly holes extending through the assembly hole sleeves, and assembly fasteners disposed in the assembly holes, with the assembly fasteners affixing the lower box to the upper box. In some embodiments, the drain structure has a drain structure seat integrally formed at an end of the drain structure, and the drain structure has a drain structure fitting integrally formed at an outside surface of the drain structure. The drain structure further has first sidewalls that separate the drain structure seat from the drain structure fitting, and second sidewalls that separate the drains structure fitting from the second wall. In some embodiments, the fluid recovery structure further includes a fluid tube retainer having a hole aligned with the ports. In some embodiments, the fluid tube retainer is a clamp disposed in the interior cavity. In some embodiments, the fluid recovery structure further includes a standoff integrally formed on an interior surface of a fourth wall of the body, and the clamp is attached to the standoff by a clamp retainer. In some embodiments, the fluid tube retainer is a retaining adapter disposed in the port opening of one of the ports.

An embodiment fluid system includes a fluid tube, and a collector disposed around the fluid tube, with the collector having a body with an interior cavity. The collector further has ports integrally formed at first walls of the body, with each of the ports having a port opening that is contiguous with the interior cavity. The fluid tube extends through the interior cavity and the port opening of each of the ports. The collector further has a drain structure integrally formed in a second wall of the body and the drain structure has a drain hole that extends from the interior cavity through the drain structure.

In some embodiments, the fluid system further includes socks, with each of the socks having an end disposed on a respective one of the ports, where the fluid tube extends through each of the socks. In some embodiments, the body includes an upper box and a lower box, the upper box and lower box have complementary assembly ridges, and the drain structure is integrally formed as part of the lower box and is disposed at a bottom wall of the lower box, and each of the ports includes an upper port portion integrally formed as part of the upper box and a lower portion integrally formed as part of the lower box. In some embodiments, the fluid system further includes a fluid tube retainer having a hole aligned with the ports, the fluid tube is disposed within the hole and is affixed to the collector by the fluid tube retainer such that the fluid tube is spaced apart from interior surfaces of the collector, and the fluid tube is spaced apart from interior surfaces of the socks. In some embodiments, the fluid tube retainer is a clamp disposed in the interior cavity. In some embodiments, the fluid system further includes a standoff integrally formed on an interior surface of a bottom wall of the collector, where the clamp is attached to the standoff by a clamp retainer. In some embodiments, the fluid tube retainer is a retaining adapter disposed in one of the port openings.

An embodiment vehicle includes an engine, a fuel tank, a fluid tube connected to the fuel tank and to the engine and configured to direct fuel from the fuel tank to the engine, and a collector mounted to a mounting point within the vehicle and disposed around the fluid tube, the collector having body with an interior cavity, and the collector further having ports integrally joined to first walls of the body, with each of the ports having a port opening that is contiguous with the interior cavity. The fluid tube extends through the interior cavity and the port opening of each of the ports, and the collector further has a drain structure integrally joined to a second wall of the body and having a drain hole that extends from the interior cavity through the drain structure. The vehicle further includes a drain tube connected to the drain structure, the drain tube configured to permit at least one of fluid and vapor collected within the interior cavity of the collector to drain from the collector through the drain tube.

In some embodiments, the vehicle further includes socks, each of the socks having an end disposed on a respective one of the ports; wherein the fluid tube extends through each of the socks, and a fluid tube retainer disposed within the collector and having a hole aligned with the ports, where the fluid tube is disposed within the hole and is affixed to the collector by the fluid tube retainer such that the fluid tube is spaced apart from interior surfaces of the collector, and where the fluid tube is spaced apart from interior surfaces of the socks. In some embodiments, the fluid tube retainer is one of a clamp disposed in the interior cavity and attached to a standoff integrally formed on an interior surface of interior cavity of the collector and a retaining adapter disposed in a port opening or one of the ports.

An embodiment method for installing a fluid recovery structure includes mounting an upper box of a collector to a mounting point on a vehicle, affixing the upper box to a fluid tube of the vehicle, affixing a lower box of the collector to the upper box of the collector after the mounting the upper box and after the affixing the upper box to the fluid tube, where, after affixing the lower box to the upper box, the fluid tube extends through port openings of ports integrally formed as part of the collector and further extends through an interior cavity of the collector such that the fluid tube is spaced apart from interior surfaces of the collector, and attaching a drain tube to a drain structure integrally formed in a wall of the collector and having a drain hole that extends from the interior cavity through the drain structure.

In some embodiments, the method further includes attaching socks to outside surfaces of the ports, where, after installing the socks, the fluid tube is spaced apart from interior surfaces of the socks.

While this invention has been described with reference to illustrative embodiments, this description is not intended to be construed in a limiting sense. Various modifications and combinations of the illustrative embodiments, as well as other embodiments of the invention, will be apparent to persons skilled in the art upon reference to the description. It is therefore intended that the appended claims encompass any such modifications or embodiments.

What is claimed is:

1. A fluid recovery structure, comprising:
a body having an interior cavity, the body including an upper box and a lower box with assembly hole sleeves integrally formed in each of the upper box and lower box, the assembly hole sleeves having assembly holes extending through the assembly hole sleeves, wherein the body further comprises sidewalls that are first walls, the sidewalls extending away from a second wall of the body toward a third wall of the body opposite the second wall, and wherein exterior surfaces of the assembly hole sleeves are spaced apart from the sidewalls and are integrally formed on one of the second wall or the third wall;
ports integrally joined to first walls of the body and having port walls that extend away from the body, each of the ports having a port opening that is contiguous with the interior cavity, and each of the ports having a retaining lip disposed on an outside surface of the respective port and spaced apart from walls of the body, wherein the retaining lip is configured to accept a sock extending over the retaining lip and to retain the sock on the outside surface of the respective port, and wherein each of the ports includes an upper port portion integrally formed as part of the upper box and a lower portion integrally formed as part of the lower box; and
a drain structure integrally joined to the second wall of the body and having a drain hole that extends from the interior cavity through the drain structure.

2. The fluid recovery structure of claim 1, wherein the upper box and lower box having complementary assembly ridges.

3. The fluid recovery structure of claim 2, further comprising:
assembly fasteners disposed in the assembly holes, the assembly fasteners affixing the lower box to the upper box.

4. The fluid recovery structure of claim 1, wherein the drain structure has a drain structure seat integrally formed at an end of the drain structure, and wherein the drain structure has a drain structure fitting integrally formed at an outside surface of the drain structure, wherein the drain structure further has first sidewalls that separate the drain structure seat from the drain structure fitting, and second sidewalls that separate the drain structure fitting from the second wall.

5. The fluid recovery structure of claim 1, further comprising a fluid tube retainer having a hole aligned with the ports.

6. The fluid recovery structure of claim 5, wherein the fluid tube retainer is a clamp disposed in the interior cavity and is disposed on a standoff that is integrally formed with the body and extends from the third wall of the body.

7. The fluid recovery structure of claim 5, wherein the fluid tube retainer is a retaining adapter disposed in the port opening of one of the ports and in direct contact with an interior surface of the port, and wherein the retaining adapter has spokes that are spaced apart from each other by spoke spaces.

8. A fluid system, comprising:
a fluid tube; and
a collector disposed around the fluid tube, the collector having a body with an interior cavity, the body including an upper box and a lower box with assembly hole sleeves integrally formed in each of the upper box and lower box, the assembly hole sleeves having assembly holes extending through the assembly hole sleeves, wherein the body further comprises sidewalls that are first walls, the sidewalls extending away from a second wall of the body toward a third wall of the body opposite the second wall, and wherein exterior surfaces of the assembly hole sleeves are spaced apart from the sidewalls and are integrally formed on one of the second wall or the third wall, the collector further having ports integrally formed at the first walls of the body, wherein each of the ports includes an upper port portion integrally formed as part of the upper box and a lower portion integrally formed as part of the lower box, each of the ports having a port opening that is contiguous with the interior cavity, each of the ports having a retaining lip disposed on an outside surface of the respective port and spaced apart from walls of the body, wherein the retaining lip is configured to accept a sock extending over the retaining lip and to retain the sock on the outside surface of the respective port, wherein the fluid tube extends through the interior cavity and the port opening of each of the ports, wherein the collector further has a drain structure integrally formed in the second wall of the body and wherein the drain structure has a drain hole that extends from the interior cavity through the drain structure.

9. The fluid system of claim 8, further comprising socks, each of the socks having an end disposed on a respective one of the ports, wherein the fluid tube extends through each of the socks.

10. The fluid system of claim 8, wherein the upper box and lower box have complementary assembly ridges; and
wherein the drain structure is integrally formed as part of the lower box and is disposed at a bottom wall of the lower box.

11. The fluid system of claim 10, further comprising a fluid tube retainer having a hole aligned with the ports, wherein the fluid tube is disposed within the hole and is affixed to the collector by the fluid tube retainer such that the fluid tube is spaced apart from interior surfaces of the collector, and wherein the fluid tube is spaced apart from interior surfaces of the socks.

12. The fluid system of claim 11, wherein the fluid tube retainer is a clamp disposed in the interior cavity.

13. The fluid system of claim 12, further comprising a standoff integrally formed on an interior surface of a bottom wall of the collector, wherein the clamp is attached to the standoff by a clamp retainer.

14. The fluid system of claim 11, wherein the fluid tube retainer is a retaining adapter disposed in a port opening of one of the ports.

15. A vehicle, comprising:
an engine;
a fuel tank;
a fluid tube connected to the fuel tank and to the engine and configured to direct fuel from the fuel tank to the engine; and
a collector mounted to a mounting point within the vehicle and disposed around the fluid tube, the collector having a body with an interior cavity, the body including an upper box and a lower box with assembly hole sleeves integrally formed in each of the upper box and lower box, the assembly hole sleeves having assembly holes extending through the assembly hole sleeves, wherein the body further comprises sidewalls that are first walls, the sidewalls extending away from a second wall of the body toward a third wall of the body opposite the second wall, and wherein exterior surfaces of the assembly hole sleeves are spaced apart from the sidewalls and are integrally formed on one of the second wall or the third wall, and the collector further having ports integrally joined to the first walls of the body, each of the ports having a port opening that is contiguous with the interior cavity, each of the ports including an upper port portion integrally formed as part of the upper box and a lower portion integrally formed as part of the lower box, each of the ports having a retaining lip disposed on an outside surface of the respective port and spaced apart from walls of the body, wherein the retaining lip is configured to accept a sock extending over the retaining lip and to retain the sock on the outside surface of the respective port, wherein the fluid tube extends through the interior cavity and the port opening of each of the ports, wherein the collector further has a drain structure integrally joined to the second wall of the body and having a drain hole that extends from the interior cavity through the drain structure; and
a drain tube connected to the drain structure, the drain tube configured to permit at least one of fluid and vapor collected within the interior cavity of the collector to drain from the collector through the drain tube.

16. The vehicle of claim 15, further comprising:
socks, each of the socks having an end disposed on a respective one of the ports; wherein the fluid tube extends through each of the socks; and
a fluid tube retainer disposed within the collector and having a hole aligned with the ports, wherein the fluid tube is disposed within the hole and is affixed to the collector by the fluid tube retainer such that the fluid tube is spaced apart from interior surfaces of the collector, and wherein the fluid tube is spaced apart from interior surfaces of the socks.

17. The vehicle of claim 16, wherein the fluid tube retainer is one of a clamp disposed in the interior cavity and attached to a standoff integrally formed on an interior surface of interior cavity of the collector and a retaining adapter disposed in a port opening of one of the ports.

18. A fluid recovery structure, comprising:
an upper box of a collector mounted to a mounting point on a vehicle, wherein the upper box is affixed to a fluid tube of the vehicle;
a lower box of the collector affixed to the upper box of the collector, wherein, while the lower box is affixed to the upper box, the fluid tube extends through port openings of ports integrally formed as part of the collector and further extends through an interior cavity of the collector such that the fluid tube is spaced apart from interior surfaces of the collector, wherein each of the ports has a retaining lip disposed on an outside surface of the respective port and spaced apart from walls of the upper box and walls of the lower box, wherein each of the ports includes an upper port portion integrally formed as part of the upper box and a lower portion integrally formed as part of the lower box, wherein the retaining lip is configured to accept a sock extending over the retaining lip and to retain the sock on the outside surface of the respective port, wherein assembly hole sleeves are integrally formed in an end wall of each of the upper box and lower box, the assembly hole sleeves having assembly holes extending through the assembly hole sleeves, wherein each of the upper box and the lower box have sidewalls, the sidewalls extending away from a respective end wall, and wherein exterior surfaces of the assembly hole sleeves are spaced apart from the sidewalls and are integrally formed on the respective end wall; and
a drain tube attached to a drain structure integrally formed in and end wall of the collector and having a drain hole that extends from the interior cavity through the drain structure.

19. The fluid recovery structure of claim 18, further comprising socks attached to outside surfaces of the ports, wherein the fluid tube is spaced apart from interior surfaces of the socks.

* * * * *